(12) United States Patent
Kakuda et al.

(10) Patent No.: US 10,696,505 B2
(45) Date of Patent: Jun. 30, 2020

(54) POSITION SWITCHING MECHANISM FOR DOCUMENT CONVEYANCE DEVICE

(71) Applicant: PFU LIMITED, Kahoku-shi, Ishikawa (JP)

(72) Inventors: Hirotoshi Kakuda, Kahoku (JP); Shigeru Yonemura, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 21 days.

(21) Appl. No.: 16/157,016

(22) Filed: Oct. 10, 2018

(65) Prior Publication Data

US 2019/0225440 A1 Jul. 25, 2019

(30) Foreign Application Priority Data

Jan. 25, 2018 (JP) .................................. 2018-010695

(51) Int. Cl.
*B65H 3/52* (2006.01)
*F16H 1/20* (2006.01)
*F16H 55/22* (2006.01)

(52) U.S. Cl.
CPC ............ *B65H 3/5261* (2013.01); *F16H 1/20* (2013.01); *F16H 55/22* (2013.01); *B65H 2301/423245* (2013.01); *B65H 2403/46* (2013.01); *B65H 2511/51* (2013.01); *B65H 2513/412* (2013.01)

(58) Field of Classification Search
CPC ................... B65H 3/06; B65H 3/5261; B65H 2301/423245
See application file for complete search history.

(56) References Cited

U.S. PATENT DOCUMENTS

| 2012/0161382 A1* | 6/2012 | Morinaga ............ B65H 3/0669 271/10.01 |
| 2012/0243019 A1 | 9/2012 | Takahashi |
| 2014/0085691 A1* | 3/2014 | Mori .................. H04N 1/00013 358/498 |
| 2018/0029815 A1* | 2/2018 | Yonemura ................ B41J 11/04 |

FOREIGN PATENT DOCUMENTS

| JP | 60-79338 | * | 5/1985 |
| JP | 2012-201445 A | | 10/2012 |
| JP | 2016-141509 A | | 8/2016 |

* cited by examiner

*Primary Examiner* — Thomas A Morrison
(74) *Attorney, Agent, or Firm* — Lewis Roca Rothgerber Christie LLP

(57) ABSTRACT

A document conveyance device includes a feed roller, a separation roller, a first motor for generating a first drive force for driving the separation roller, a planet gear, a drive gear, a second motor for generating a second drive force, and a position switching mechanism for switching a position of the planet gear from a first position in which the planet gear is separated from the drive gear and does not transmit the first drive force to the separation roller to a second position in which the planet gear engages with the drive gear and transmits the first drive force to the separation roller, based on the second drive force. The position switching mechanism includes a support member for supporting the planet gear, and a transfer mechanism for moving the support member so that the planet gear engages with the drive gear, based on the second drive force. The further movement of the planet gear is prevented after the planet gear engaged with the drive gear.

5 Claims, 16 Drawing Sheets

POSITION SWITCHING MECHANISM FOR DOCUMENT CONVEYANCE DEVICE

CROSS-REFERENCE TO RELATED APPLICATIONS

This application is based upon and claims the benefit of priority of prior Japanese Patent Application No. 2018-010695, filed on Jan. 25, 2018, the entire contents of which are incorporated herein by reference.

TECHNICAL FIELD

The present embodiment relates to document conveying technology.

BACKGROUND

A document conveyance device that conveys each of document papers to be conveyed from stacked document papers is known. The document conveyance device includes a conveyance roller for conveying the document papers in the conveying direction and a retard roller for regulating the conveyance of the document papers to sequentially convey each of the document papers by separating the document paper from other document papers.

Japanese Unexamined Patent Publication (Kokai) No. 2016-141509 discloses a document conveyance device that can conduct the separation conveying for conveying a single paper medium by separating the single paper medium from paper media and the non-separation conveying for conveying paper media without conducting the separation conveying. In this document conveyance device, whether to conduct the separation conveying is switched by moving manually an operation part provided to a housing of an image read device to change combination of engaging gears disposed on a drive force transmission path in which a drive force is transmitted from a motor to a retard roller.

SUMMARY

To switch the separation conveying and the non-separation conveying of the document papers, using the drive force of the motor, certain components are moved and combinations of gears disposed on a drive force transmission path are changed. However, due to a production error and the like of components, it may be difficult to move the components correctly by the motor and combinations of gears may not be appropriately changed.

An object of the present embodiment is to provide a document conveyance device that can appropriately change combinations of gears regardless of the production error and the like of the moving components when switching separation conveying and non-separation conveying.

According to an aspect of the apparatus, there is provided a document conveyance device. The document conveyance device includes a feed roller for feeding a document paper, a separation roller facing the feed roller, a first motor for generating a first drive force for driving the separation roller, a planet gear, a drive gear for engaging with the planet gear, a second motor for generating a second drive force, and a position switching mechanism for switching a position of the planet gear from a first position in which the planet gear is separated from the drive gear and does not transmit the first drive force to the separation roller to a second position in which the planet gear engages with the drive gear and transmits the first drive force to the separation roller, based on the second drive force, wherein the position switching mechanism includes a support member for supporting the planet gear, and a transfer mechanism for moving the support member so that the planet gear engages with the drive gear, based on the second drive force, and the further movement of the planet gear is prevented after the planet gear engaged with the drive gear.

According to an aspect of the method, there is provided a control method executed by a document conveyance device including a feed roller for feeding a document paper, a separation roller facing the feed roller, a first motor for generating a first drive force for driving the separation roller, a planet gear, a drive gear for engaging with the planet gear, a second motor for generating a second drive force, a support member for supporting the planet gear and a transfer mechanism for moving the support member so that the planet gear engages with the drive gear, based on the second drive force. The control method includes switching a position of the planet gear from a first position in which the planet gear is separated from the drive gear and does not transmit the first drive force to the separation roller to a second position in which the planet gear engages with the drive gear and transmits the first drive force to the separation roller, based on the second drive force, and preventing a further movement of the planet gear after the planet gear engaged with the drive gear.

According to an aspect of the computer-readable, non-transitory medium storing a computer program, the computer program causes a document conveyance device including a feed roller for feeding a document paper, a separation roller facing the feed roller, a first motor for generating a first drive force for driving the separation roller, a planet gear, a drive gear for engaging with the planet gear, a second motor for generating a second drive force, a support member for supporting the planet gear and a transfer mechanism for moving the support member so that the planet gear engages with the drive gear, based on the second drive force. The computer program causing the document conveyance device to execute switching of a position of the planet gear from a first position in which the planet gear is separated from the drive gear and does not transmit the first drive force to the separation roller to a second position in which the planet gear engages with the drive gear and transmits the first drive force to the separation roller, based on the second drive force, and preventing a further movement of the planet gear after the planet gear engaged with the drive gear.

The object and advantages of the embodiment will be realized and attained by means of the elements and combinations particularly pointed out in the claims. It is to be understood that both the foregoing general description and the following detailed description are exemplary and explanatory, and are not restrictive of the embodiment, as claimed.

DESCRIPTION OF EMBODIMENTS

Hereinafter, a document conveyance device, a control method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
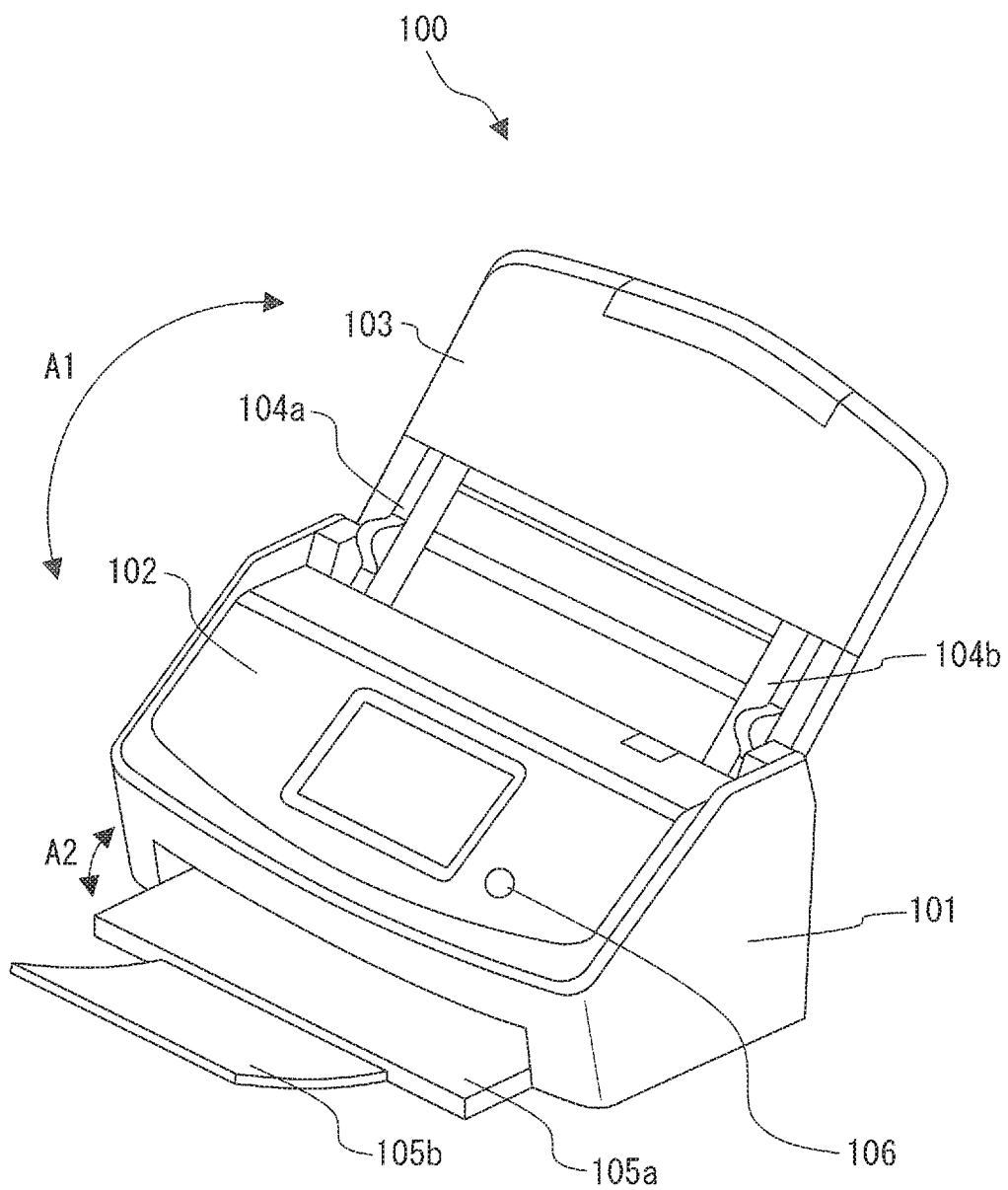
FIG. 1 is a perspective view illustrating a document conveyance device 100.

FIG. 1 is a perspective view illustrating the document conveyance device 100 configured as an image scanner.

The document conveyance device 100 includes a lower housing 101, an upper housing 102, a paper feed tray 103, a paper discharge tray 105a, an auxiliary tray 105b, an operation button 106 and the like.

The upper housing 102 is positioned to cover an upper surface of the document conveyance device 100 and engages with the lower housing 101 through a hinge such that the upper housing can be opened and closed when the document paper jam occurred or inside of the document conveyance device 100 is cleaned.

The paper feed tray 103 engages with the lower housing 101 through the hinge such that the paper feed tray 103 can rotate in directions indicated by an arrow A1 and in a state where the paper feed tray 103 is opened as illustrated in FIG. 1, it is possible to place document papers on the paper feed tray 103. The paper feed tray 103 includes side guides 104a and 104b that can move in a horizontal direction relative to the conveying direction of the document papers. The side guides 104a and 104b are positioned according to the width of the document paper to regulate the document papers in width direction.

The paper discharge tray 105a engages with the lower housing 101 through the hinge such that the paper discharge tray 105a can rotate in directions indicated by an arrow A2. When necessary, the auxiliary tray 105b is extracted from the paper discharge tray 105a to hold papers.

The operation button 106 is disposed on a surface of the upper housing 102, and when the operation button 106 is pressed, an operation detection signal for instructing the switching whether to separate the document papers is generated and output.

Figure 2:
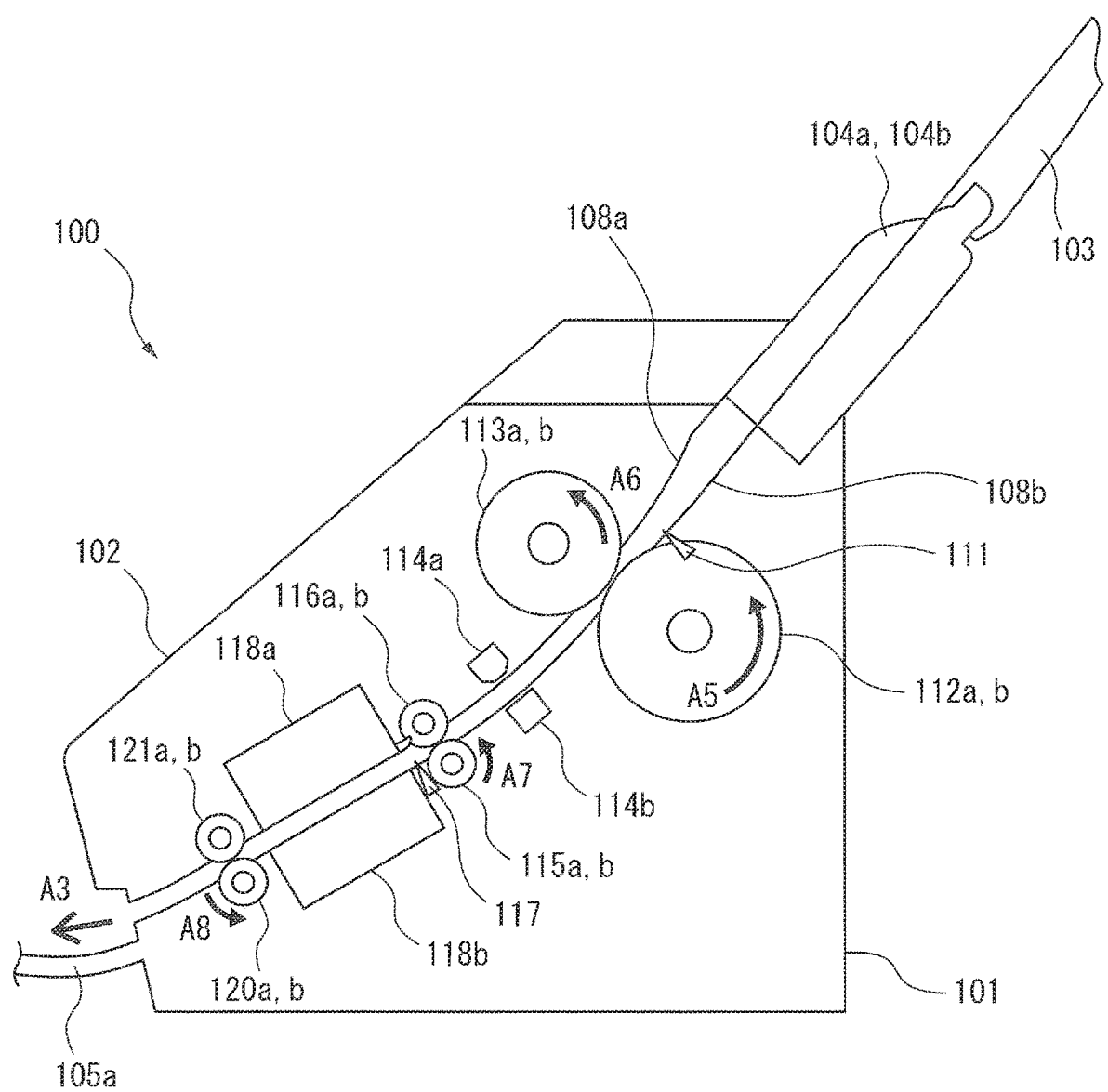
FIG. 2 is a drawing for explaining a conveying path inside the document conveyance device 100.

FIG. 2 is a drawing for explaining a conveying path inside the document conveyance device 100.

The conveying path inside the document conveyance device 100 includes a first sensor 111, a feed roller 112a, 112b, a retard roller 113a, 113b, an ultrasonic transmitter 114a, an ultrasonic receiver 114b, a first conveyance roller 115a, 115b, a first driven roller 116a, 116b, a second sensor 117, a first image capturing device 118a, a second image capturing device 118b, a second conveyance roller 120a, 120b, a second driven roller 121a, 121b and the like.

Hereinafter, the feed roller 112a, 112b may be collectively referred to as a feed roller 112. The retard roller 113a, 113b may be collectively referred to as a retard roller 113. The first conveyance rollers 115a and 115b may be collectively referred to as a first conveyance roller 115. The first driven rollers 116a and 116b may be collectively referred to as a first driven roller 116. The second conveyance rollers 120a and 120b may be collectively referred to as a second conveyance roller 120. The second driven rollers 121a and 121b may be collectively referred to as a second driven roller 121.

The bottom surface of the upper housing 102 forms an upper guide 108a of the conveying path of the document paper, and alternatively, the upper surface of the lower housing 101 forms a lower guide 108b of a conveying path of the document paper. In FIG. 2, an arrow A3 indicates a conveying direction of the document papers. Hereinafter, the term upper stream indicates an upper stream of a conveying direction A3 of the document papers and a term downstream indicates the downstream of the conveying direction A3 of the document papers.

The first sensor 111 is a contact detection sensor, is disposed to an upper stream sides of the feed roller 112 and the retard roller 113, and detects whether the document papers are placed on the paper feed tray 103.

The ultrasonic transmitter 114a and the ultrasonic receiver 114b are disposed in the vicinity of the conveying path of the document paper facing each other across the conveying path. The ultrasonic transmitter 114a transmits an ultrasonic sound wave. Alternatively, the ultrasonic receiver 114b detects the ultrasonic sound wave that is transmitted from the ultrasonic transmitter 114a and passed through the document paper, generates an ultrasonic signal, i.e., an electric signal according to the detected ultrasonic sound wave, and outputs the signal. Hereinafter, the ultrasonic transmitter 114a and the ultrasonic receiver 114b may be collectively referred to as an ultrasonic sensor 114.

The second sensor 117 is a contact detection sensor and disposed at the downstream sides of the first conveyance roller 115 and the first driven roller 116 and the upper stream sides of the first image capturing device 118a and the second image capturing device 118b. The second sensor 117 detects the presence of the document papers between the first conveyance roller 115 and the first driven roller 116, and the first image capturing device 118a and the second image capturing device 118b.

The first image capturing device 118a includes an equal magnification optics type contact image sensor (CIS) having an image pick-up device of a charge coupled device (CCD) linearly arranged in the main scanning direction. The first image capturing device 118a reads a rear surface of the document paper, captures an image of the rear surface, and generates an image signal for outputting the image signal. The first image capturing device 118a includes a light source for irradiating the rear surface of the document paper and a white reference plate used for correcting an image captured by the second image capturing device 118b.

Similarly, the second image capturing device 118b includes an equal magnification optics type CIS having image pick-up devices of CCD linearly arranged in the main scanning direction. The second image capturing device 118b reads a front surface of the document paper, captures an image of the front surface, and generates an image signal for outputting the image signal. Further, the second image capturing device 118b includes a light source for irradiating the front surface of the document paper and a white reference plate used for correcting the image captured by the first image capturing device 118a.

Note that instead of the CCD, the complementary metal oxide semiconductor (CMOS) may be used. Further, instead of the CIS, a reduction optical type image sensor may be used. Hereinafter, the first image capturing device 118a and the second image capturing device 118b may be collectively referred to as an image capturing device 118.

The feed roller 112 feeds a document paper. The document paper placed on the paper feed tray 103 is fed in the document conveyance device 100 as the feed roller 112 rotates in the direction of the arrow A5 of FIG. 2, and conveyed in the direction A3 between the upper guide 108a and the lower guide 108b. When the document paper is conveyed, the retard roller 113 rotates in the direction of the arrow A6 of FIG. 2. When document papers are placed on the paper feed tray 103, only a document paper contacting the feed roller 112 is separated from the document papers placed on the paper feed tray 103 by the operations of the feed roller 112 and the retard roller 113. Accordingly, the feed roller 112 and the retard roller 113 function as conveyor for conveying the document papers, operate to restrict the conveyance of the document papers other than the separated document paper (prevention of multi feeding), and function as separator for separating the document papers. The retard roller 113 is an example of a separation roller facing the feed roller 112.

The document paper is fed between the first conveyance roller 115 and the first driven roller 116 while being guided by the upper guide 108a and the lower guide 108b. As the first conveyance roller 115 rotates in the direction of the arrow A7 of FIG. 2, the document paper is fed between the first image capturing device 118a and the second image capturing device 118b. The document paper read by the image capturing device 118 is discharged on the paper discharge tray 105a as the second conveyance roller 120 rotates in the direction of the arrow A8 of FIG. 2.

<Configuration of Document Conveyance Device 100>

Figure 3:
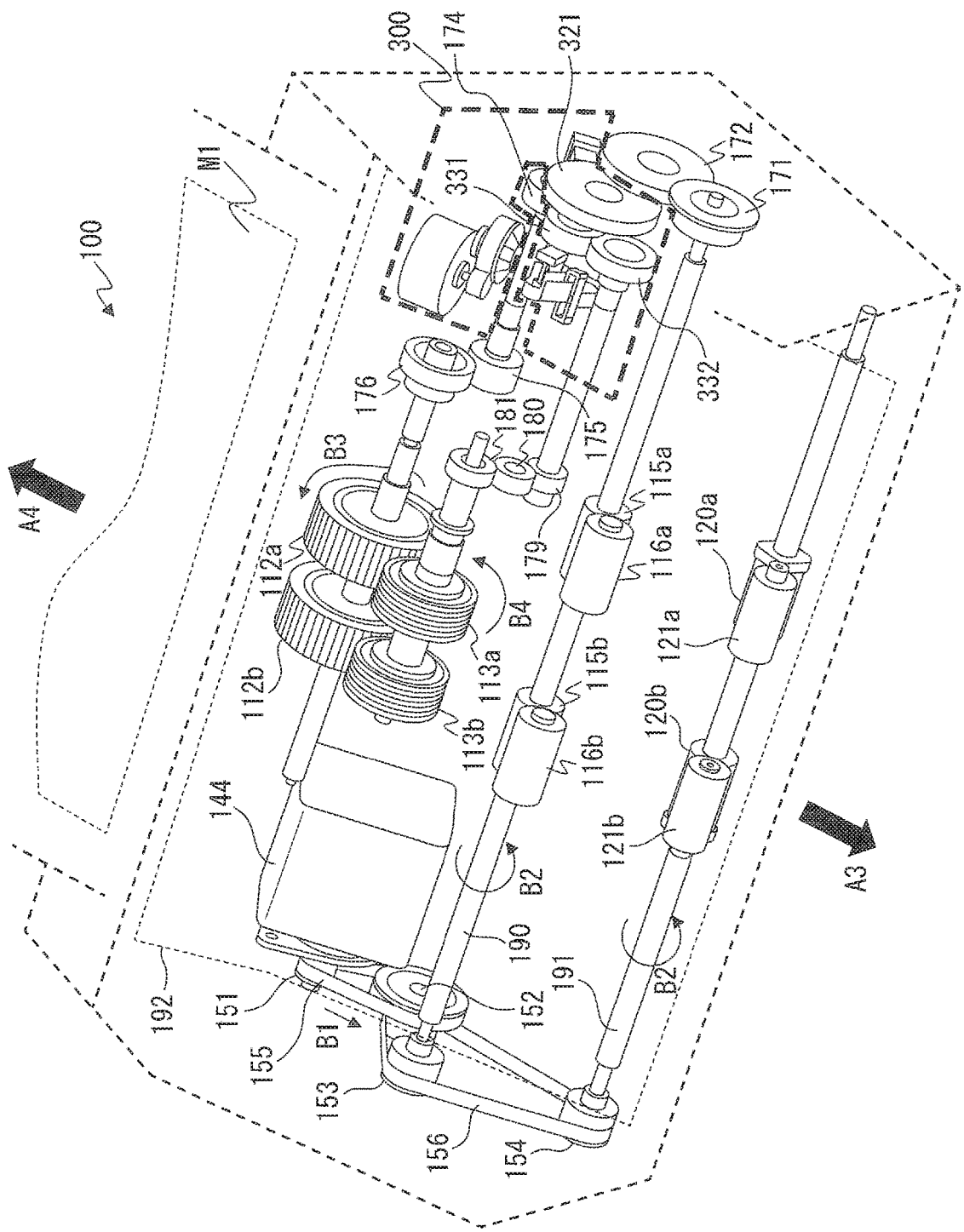
FIG. 3 is a perspective view for explaining the configuration and the operation of the document conveyance device 100.

FIG. 3 is a perspective view for explaining configuration and operation of a drive mechanism of the document conveyance device 100.

A first motor 144 is one example of a first drive force generator and generates the first drive force for driving the feed roller 112, the retard roller 113, the first conveyance roller 115 and the second conveyance roller 120.

A first pulley 151 is directly attached to the first motor 144. A second pulley 152 is integrally formed of two pulley parts in coaxial state having different outer diameters. A first belt 155 is stretched between a pulley part having a larger outer diameter of the second pulley 152 and the first pulley 151. A second belt 156 is stretched among a pulley part having a smaller outer diameter of the second pulley 152, a third pulley 153, and a fourth pulley 154. A third pulley rotation shaft 190 is attached to the third pulley 153, and a fourth pulley rotation shaft 191 is attached to the fourth pulley 154.

A fifth gear 171 is attached to the third pulley rotation shaft 190. A sixth gear 172 is integrally formed of two gear parts in coaxial state having different outer diameters, and the fifth gear 171 engages with a gear part having a larger outer diameter of the sixth gear 172. A sun gear 321 is integrally formed of two gear parts in coaxial state having different outer diameters, and the gear part having the smaller outer diameter of the sixth gear 172 engages with the gear part having the larger outer diameter of the sun gear 321. The gear part having the smaller outer diameter of the sun gear 321 engages with an eighth gear 174, and the eighth gear 174 is connected with a ninth gear 175 via a rotation shaft. The ninth gear 175 engages with a tenth gear 176 and the tenth gear 176 is directly attached to the rotation shaft of the feed roller 112a and 112b.

The planet gear 331 is disposed so as to be movable around the gear part having the smaller outer diameter of the sun gear 321 while being engaged with it at all times. A drive gear 332 is connected with a thirteenth gear 179 via the rotation shaft, and the thirteenth gear 179 engages with a fourteenth gear 180. The fourteenth gear 180 engages with a fifteenth gear 181, and the fifteenth gear 181 is directly attached to the rotation shaft of the retard roller 113a and 113b.

The third pulley rotation shaft 190 includes the first conveyance roller 115, and the first driven roller 116 is provided above the first conveyance roller 115 so as to face the first conveyance roller 115.

Similarly, the fourth pulley rotation shaft 191 includes the second conveyance roller 120, and the second driven roller 121 is provided above the second conveyance roller 120 so as to face the second conveyance roller 120.

<Operation of Document Conveyance Device 100>

Hereinafter, with reference to FIG. 3, operation of the document conveyance device 100 when the first motor 144 rotates forward is described. It is assumed that when the document paper is conveyed in the direction of the arrow A3 in the drawing, the first motor 144 rotates forward.

When first drive force generation means, i.e., the first motor 144 rotates forward, the first pulley 151 rotates in the direction of the arrow B1, and the third pulley rotation shaft 190 and the fourth pulley rotation shaft 191 respectively rotate in the direction of the arrow B2. Then, the first conveyance roller 115 and the first driven roller 116, and the second conveyance roller 120 and the second driven roller 121 convey a document paper MI, which has passed the feed roller 112 and the retard roller 113, to the direction of the arrow A3.

In response to the rotation of the third pulley rotation shaft 190 in the direction of the arrow B2, the fifth gear 171, the sixth gear 172, the sun gear 321, the eighth gear 174, the ninth gear 175 and the tenth gear 176 rotate, and the feed roller 112 rotates in the direction of the arrow B3.

When the document paper separation is conducted (separation conveying), as described later, the planet gear 331 engages with the drive gear 332. In response to the rotation of the third pulley rotation shaft 190 in the direction of the arrow B2, the fifth gear 171, the sixth gear 172, the sun gear 321, the planet gear 331, the drive gear 332, the thirteenth gear 179, the fourteenth gear 180 and the fifteenth gear 181 rotate, and the retard roller 113 rotates in the direction of the arrow B4. In other words, the retard roller 113 is rotated in a direction opposite to the feed roller 112, and conducts the document paper separation.

The retard roller 113 includes an unillustrated torque limiter. When the certain torque or more is applied to the retard roller 113, even if the fifteenth gear 181 rotates, the retard roller 113 does not rotate in the direction of the arrow B4, and the retard roller 113 is driven in the direction of the arrow A3 in response to the conveyance of the document paper.

When the document paper separation is not conducted (non-separation conveying), as described later, the planet gear 331 does not engage with the drive gear 332. Accordingly, even if the first pulley 151 rotates in the direction of the arrow B1 by the first motor 144, the drive force is not transmitted to the drive gear 332, and the retard roller 113 does not rotate in the direction of the arrow B4. In this case, the retard roller 113 is driven by the rotation of the feed roller 112.

The configuration illustrated in FIG. 3 is one example, and as a method of transmitting the drive force from the first motor 144 to the first conveyance roller 115, the second conveyance roller 120, the feed roller 112 and the retard roller 113, other combinations of gears, pulleys, rotation shafts and the like may be used.

<Position Switching Mechanism>

Figure 4:
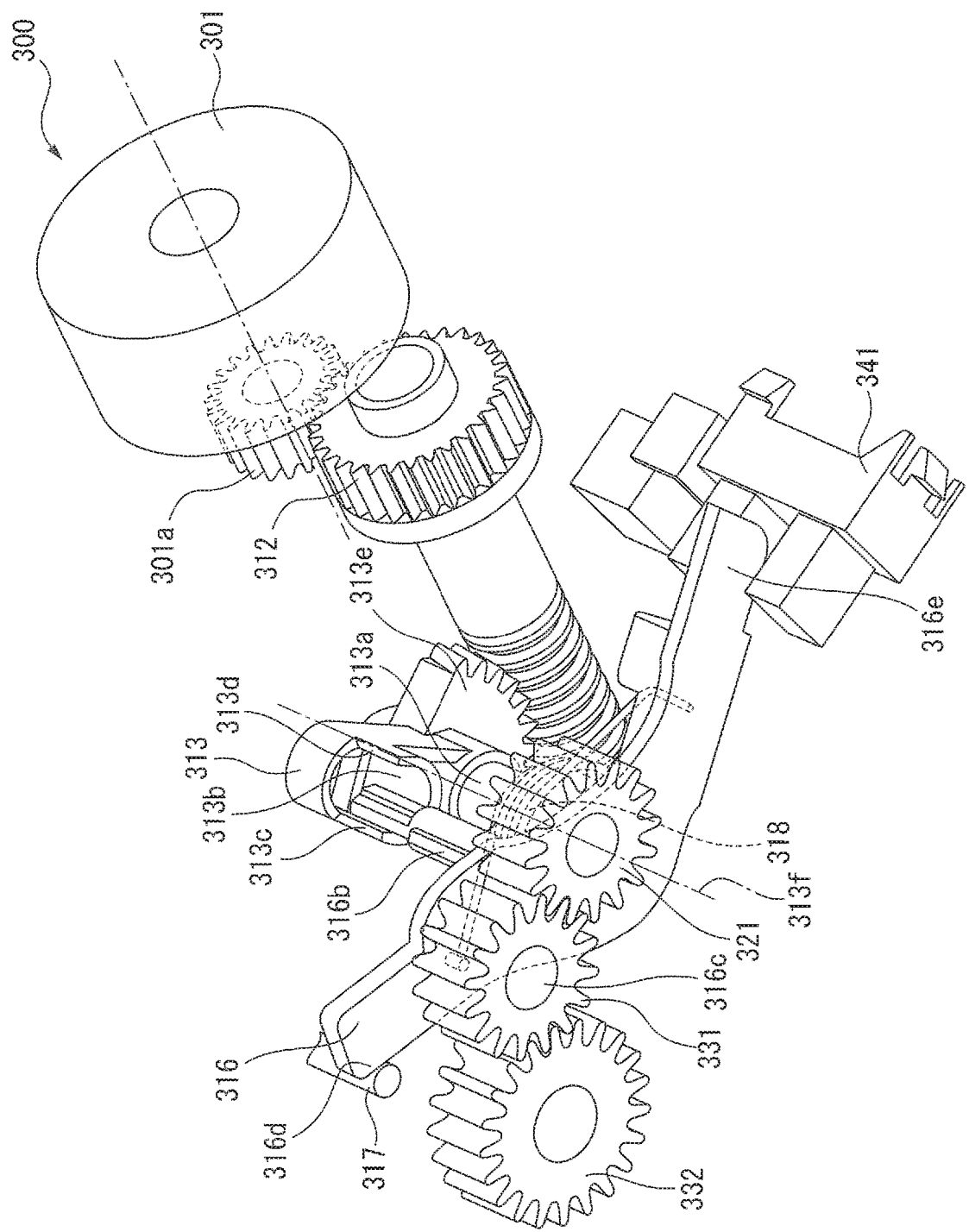
FIG. 4 is a perspective view for explaining a configuration of a position switching mechanism of the document conveyance device 100.

FIG. 4 is a perspective view for explaining a configuration of the position switching mechanism of the document conveyance device 100.

The position switching mechanism 300 includes the second motor 301, a worm gear 312, a worm wheel 313, an arm 316, a stopper 317, a spring 318, the sun gear 321, the planet gear 331, the drive gear 332, an arm sensor 341 and the like. For convenience, FIG. 4 illustrates only the gear part having the smaller outer diameter of the sun gear and does not illustrate the gear part having the larger outer diameter.

Second drive force generation means, i.e., the second motor 301 is a step motor that can rotate forward and backward and the rotation thereof is controlled by a controller 202a or a processing circuit 500 described later. A motor gear 301a is attached to the rotation shaft of the second motor 301 and engages with a portion of the worm gear 312 that rotates in response to the rotation of the second motor 301. The second motor 301 generates a second drive force for switching a position of the planet gear 331.

The worm wheel 313 is an example of a stop member for stopping the arm 316 against the pressing force by the spring 318. The worm gear 312 is an example of a move member for moving the worm wheel 313. The worm gear 312 and the worm wheel 313 are an example of a transfer mechanism. The worm wheel 313 includes a junction 313a, a concave portion 313b, and a first contact portion 313c and a second contact portion 313d in the concave portion 313b, and a fan-shaped junction 313e that engages with the other part of the worm gear 312.

The arm 316 is an example of a support member for supporting the planet gear 331. The arm 316 includes a junction 316a (not illustrated), a protrusion 316b, a rotation shaft 316c, a contact portion 316d and an end 316e, and the planet gear 331 is rotatably attached to the rotation shaft 316c. The junction 313a of the worm wheel 313 and the junction 316a of the arm 316 are rotatably supported by a frame (not illustrated) in the lower housing 101 such that the junction 313a of the worm wheel 313 and the junction 316a of the arm 316 have the same rotation center. In other words, the worm wheel 313 and the arm 316 rotate about a rotation shaft 313f. A tip of the protrusion 316b of the arm 316 is disposed in the concave portion 313b of the worm wheel 313.

The spring 318 presses the arm 316 so that the planet gear 331 engages with the drive gear 332. In other words, the spring 318 presses the arm 316 so that the planet gear moves closer to the drive gear. The spring 318 is disposed at the circumference of the junction 313a of the worm wheel 313, and applies the biasing force in a direction in which the arm 316 is rotated toward the stopper 317. The stopper 317 is an example of a block member for blocking a further movement of the arm 316 by contacting the arm 316 with the stopper 317. When the planet gear 331 is moved toward the drive gear 332 by the movement of the arm 316, the contact portion 316d of the arm 316 contacts the stopper 317 at a position where the planet gear 331 appropriately engages with the drive gear 332, and the movement of the arm 316 is stopped. The stopper 317 is fixed to a frame (not illustrated) in the lower housing 101.

The arm sensor 341 is disposed in the vicinity of the end 316e of the arm 316, detects that the end 316e moves to a certain position by the movement of the arm 316, and outputs an arm detection signal to a determiner 202b or the processing circuit 500 described later. Specifically, the end 316e and the arm sensor 341 are positioned such that the arm sensor 341 outputs the arm detection signal when the arm 316 is in the position where the contact portion 316d of the arm 316 contacts the stopper 317 and the movement of the arm 316 is stopped.

The worm gear 312, the worm wheel 313, the arm 316, the stopper 317 and the spring 318 are an example of a position switching mechanism. The configuration illustrated in FIG. 4 is one example, and as a method for transmitting the drive force of the second motor 301 to the arm 316, other combinations of gears, pulleys, rotation shafts and the like may be used.

<Operation of Position Switching Mechanism>

Figure 5:
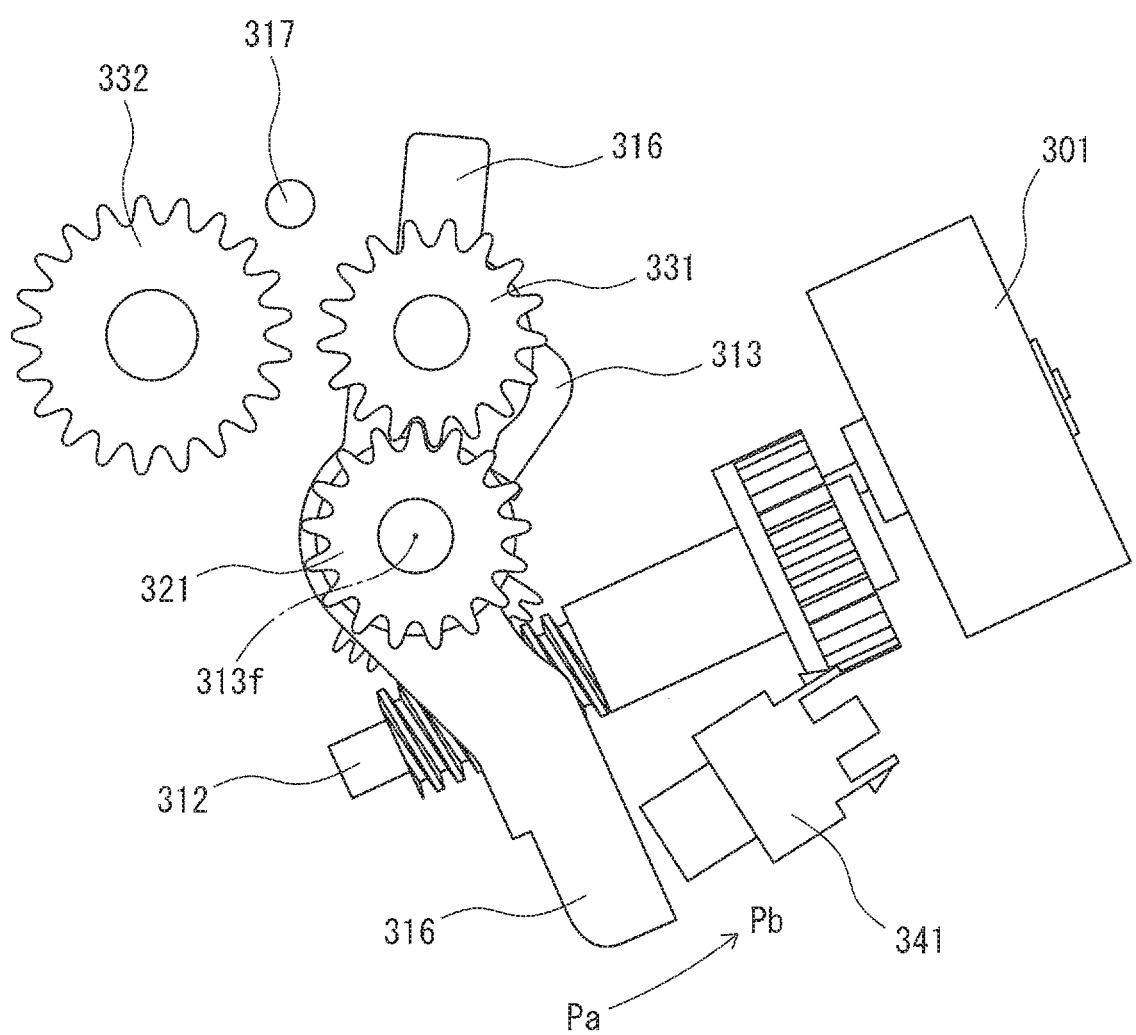
FIG. 5 is a side view for explaining a state of a position switching mechanism 300 in the non-separation conveying.
Figure 6:
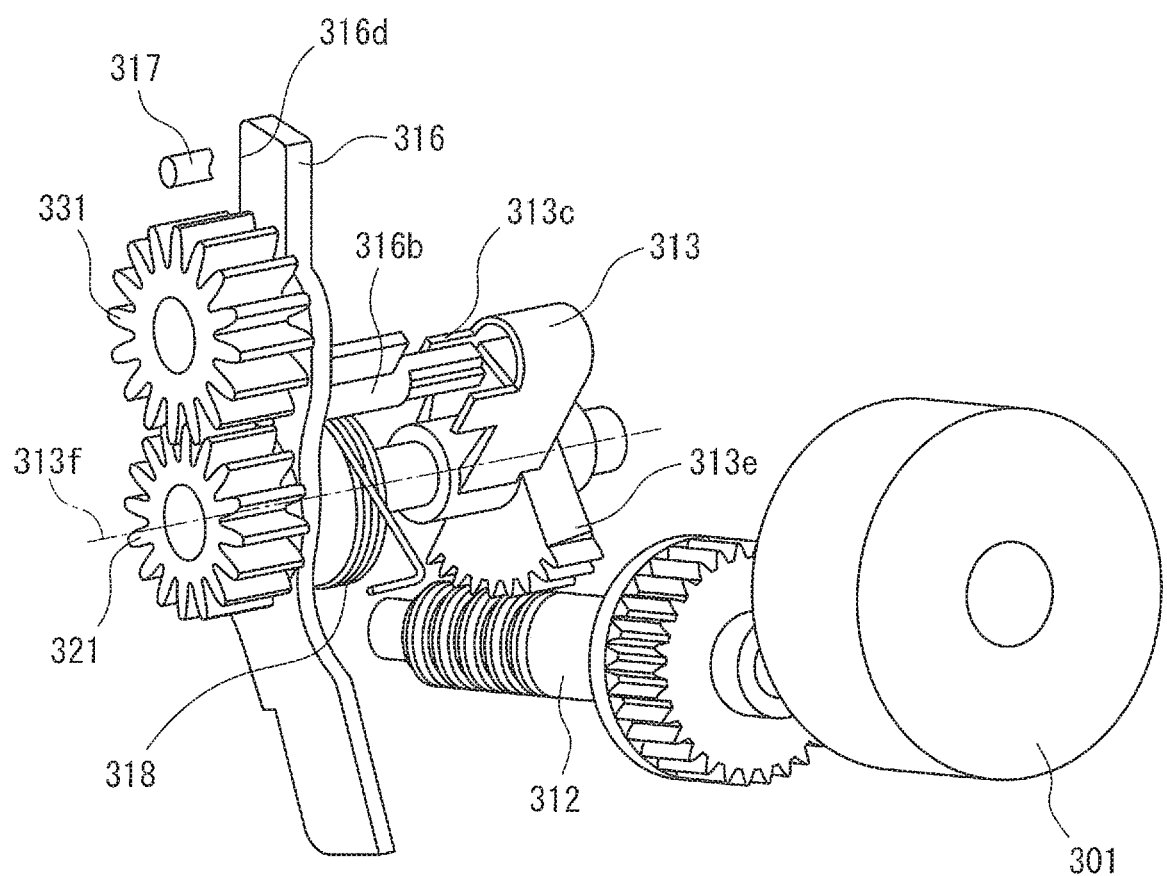
FIG. 6 is a perspective view for explaining a state of the position switching mechanism 300 in the non-separation conveying.

FIG. 5 and FIG. 6 are drawings for explaining states of the position switching mechanism 300 when the document papers are not separated (non-separation conveying). FIG. 5 is a side view obtained by seeing the position switching mechanism 300 from the side, and FIG. 6 is a perspective view. For convenience, FIG. 6 does not illustrate the drive gear 332 and the arm sensor 341.

In FIG. 5 and FIG. 6, the planet gear 331 does not engage with the drive gear 332, the drive force from the sun gear 321 is not transmitted to the drive gear 332, and thus, the drive force of the first motor 144 is not transmitted to the retard roller 113. In this state, the fan-shaped junction 313e that engages with the worm gear 312 locks the worm wheel 313 in the illustrated state. As described above, the biasing force for rotating the arm 316 toward the stopper 317 is applied to the arm 316 through the spring 318. Through this biasing force, the arm 316 is pressed in a direction in which the planet gear 331 is moved toward the drive gear 332. However, since the tip of the protrusion 316b of the arm 316 contacts the first contact portion 313c in the concave portion 313b of the worm wheel 313, the arm 316 remains in the illustrated state. Thus, a state where the planet gear 331 does not engage with the drive gear 332 is maintained.

Figure 7:
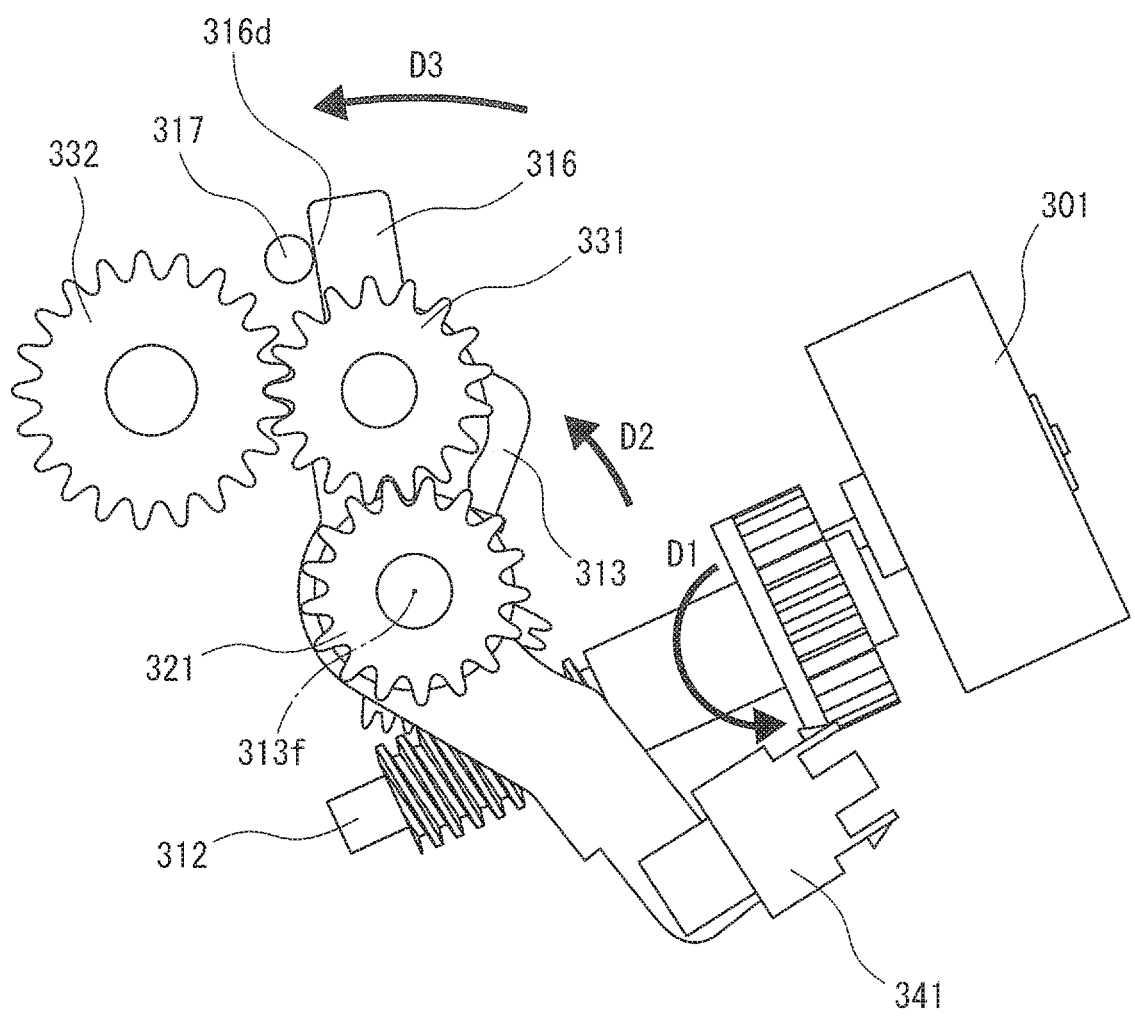
FIG. 7 is a side view for explaining a state of the position switching mechanism 300 in the separation conveying.
Figure 8:
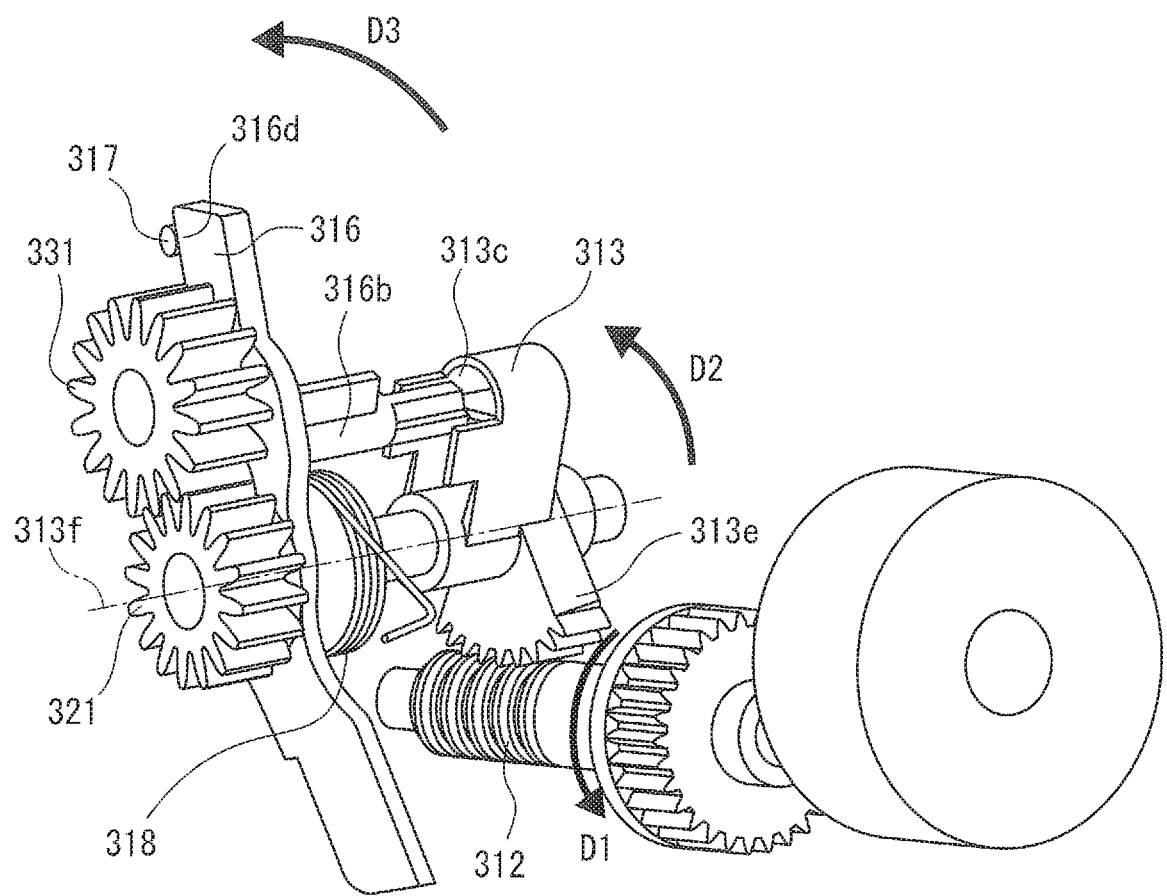
FIG. 8 is a perspective view for explaining a state of the position switching mechanism 300 in the separation conveying.

FIG. 7 and FIG. 8 are drawings for explaining states of the position switching mechanism 300 when the document papers are separated (separation conveying). FIG. 7 is a side view obtained by seeing the position switching mechanism 300 from the side, and FIG. 8 is a perspective view. For convenience, FIG. 8 does not illustrate the drive gear 332 and the arm sensor 341.

When the second motor 301 rotates forward from states of FIG. 5 and FIG. 6, the worm gear 312 rotates in the direction of the arrow D1. In response to the rotation of the worm gear 312, the fan-shaped junction 313e of the worm wheel 313 that engages with the worm gear 312 moves along the worm gear 312, and the worm wheel 313 rotates in the direction of the arrow D2. When the worm wheel 313 rotates in the direction of the arrow D2 by the rotation of the worm wheel 313, the arm 316 also rotates in the direction of the arrow D3.

The biasing force toward the stopper 317 is applied to the arm 316 through the spring 318, but since the protrusion 316b of the arm 316 contacts the first contact portion 313c of the worm wheel 313, the arm 316 stays in the certain position against the biasing force of the spring 318. Under such state, the worm wheel 313 rotates (move), and thus, the arm 316 also rotates (move).

The arm 316 rotates in the direction of the arrow D3, and when the stopper 317 contacts the contact portion 316d of the arm 316, the rotation of the arm 316 is stopped. At the point of time when the arm 316 is stopped, the arm sensor 341 detects the end 316e of the arm 316, and the arm sensor 341 outputs the arm detection signal to the determiner 202b or the processing circuit 500 described later.

At the point of time when the rotation of the arm 316 is stopped, the planet gear 331 appropriately engages with the drive gear 332, and thus, the drive force from the sun gear 321 is transmitted to the retard roller 113 via the planet gear 331 and the drive gear 332. As stated above, the worm gear 312, the worm wheel 313, the arm 316, the stopper 317 and the spring 318 switch a position of the planet gear 331 from a first position in which the planet gear 331 is separated from the drive gear 332 and does not transmit the first drive force to the retard roller 113 to a second position in which the planet gear 331 engages with the drive gear 332 and transmits the first drive force to the separation roller 113, based on the second drive force from the second motor 301. The worm gear 312 moves the worm wheel 313 to move the arm 316 so that the planet gear 331 engages with the drive gear 332, based on the second drive force. In other words, the worm gear 312 and the worm wheel 313 move the planet gear 331 to a side of the drive gear 332 by moving the arm 316, based on the second drive force.

Figure 9:
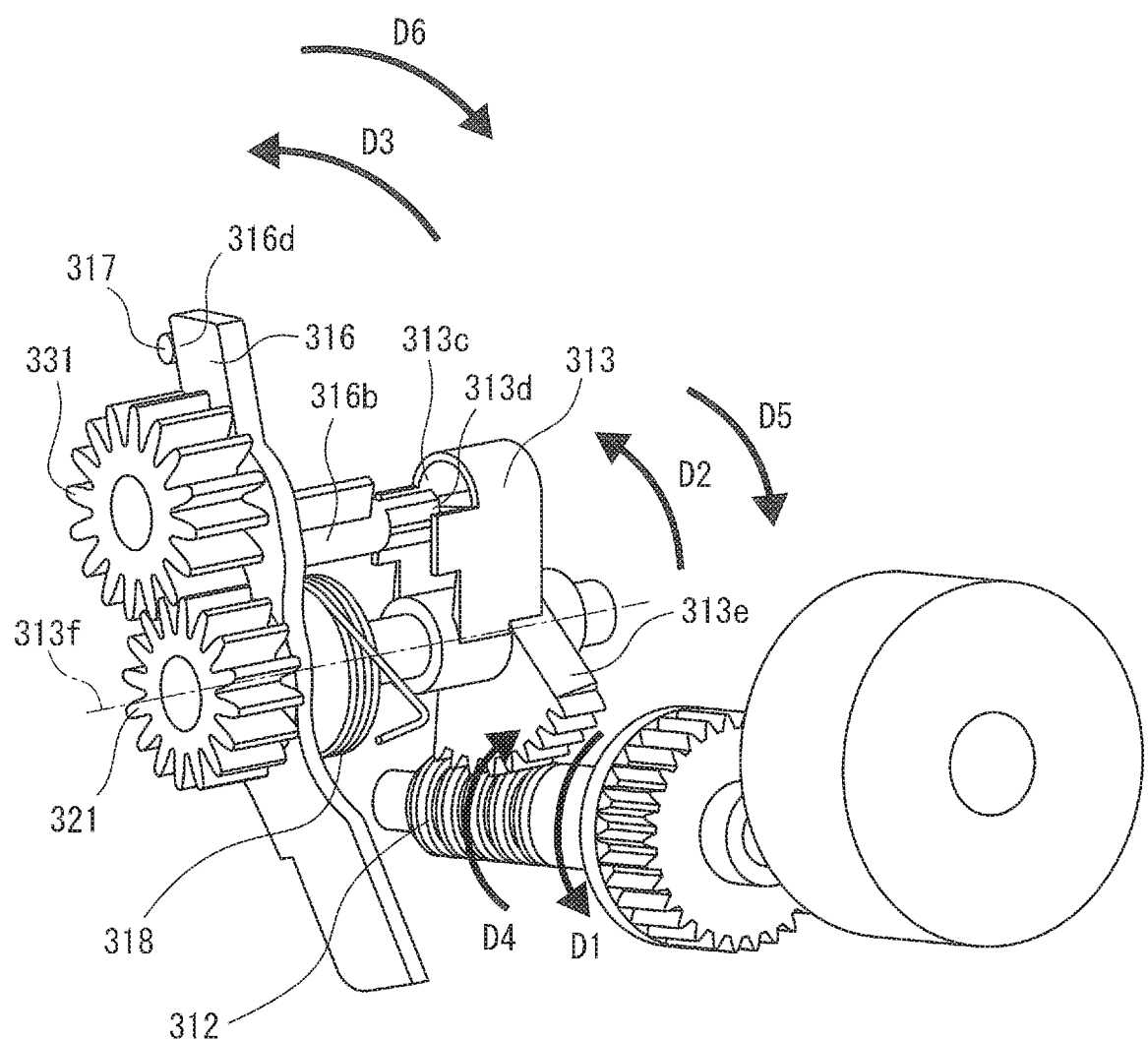
FIG. 9 is a perspective view illustrating a state in which a second motor 301 further rotated in forward after a planet gear engaged with a drive gear.

FIG. 9 is a perspective view illustrating a state in which the second motor 301 further rotated forward from the state of FIG. 8. For convenience, FIG. 9 does not illustrate the drive gear 332 and the arm sensor 341.

After the arm 316 was stopped, the second motor 301 further rotates forward, the worm wheel 313 rotates in the direction of the arrow D2. However, since the protrusion 316b of the arm 316 may not rotate any further, as illustrated in FIG. 9, the protrusion 316b of the arm 316 is apart from the first contact portion 313c of the worm wheel 313, and the locking of the arm 316 by the worm wheel 313 is released.

Although it is possible to control the number of rotations of the second motor 301 in step unit, considering a problem in a manufacturing accuracy of components such as the worm gear 312, the worm wheel 313, and the arm 316, it is not easy to correctly control a position of the planet gear 331. In the position switching mechanism 300, the position control of the planet gear 331 is determined based on the contact portion 316d between the stopper 317 and the arm 316, and is not determined based on the number of rotations of the second motor 301. In other words, in the position switching mechanism 300, since the concave portion 313b of the worm wheel 313 has the backlash, even if after the arm 316 was stopped, the worm wheel 313 rotates somewhat, so in the concave portion 313b of the worm wheel 313, the protrusion 316b is apart from the first contact portion 313c, and the load is not applied to the arm 316 itself. Thus, the controller 202a or the processing circuit 500 described later may rotate the second motor 301 by the number of rotations sufficient for the arm 316 to contact the stopper 317 and stop.

For switching separation conveying to non-separation conveying, the second motor 301 is rotated inversely and the worm gear 312 is rotated in the direction of the arrow D4. In response to the above, when the worm wheel 313 rotates in the direction of the arrow D5, the protrusion 316b of the arm 316 contacts the first contact portion 313c of the worm wheel 313, and the arm 316 rotates in the direction of the arrow D6 against the biasing force of the spring 318. The arm 316 rotates in the direction of the arrow D6, and thus, the planet gear 331 separates from the drive gear 332 and the state of the position switching mechanism 300 returns to the state illustrated in FIG. 5 and FIG. 6. As stated above, the further movement of the planet gear 331 is prevented after the planet gear 331 engaged with the drive gear 332. The worm gear 312 moves the worm wheel 313 so that the worm wheel 313 is apart from the arm 316 after the planet gear 331 engaged with the drive gear 332.

<Explanation of Force Acting on Planet Gear>

Figure 10:
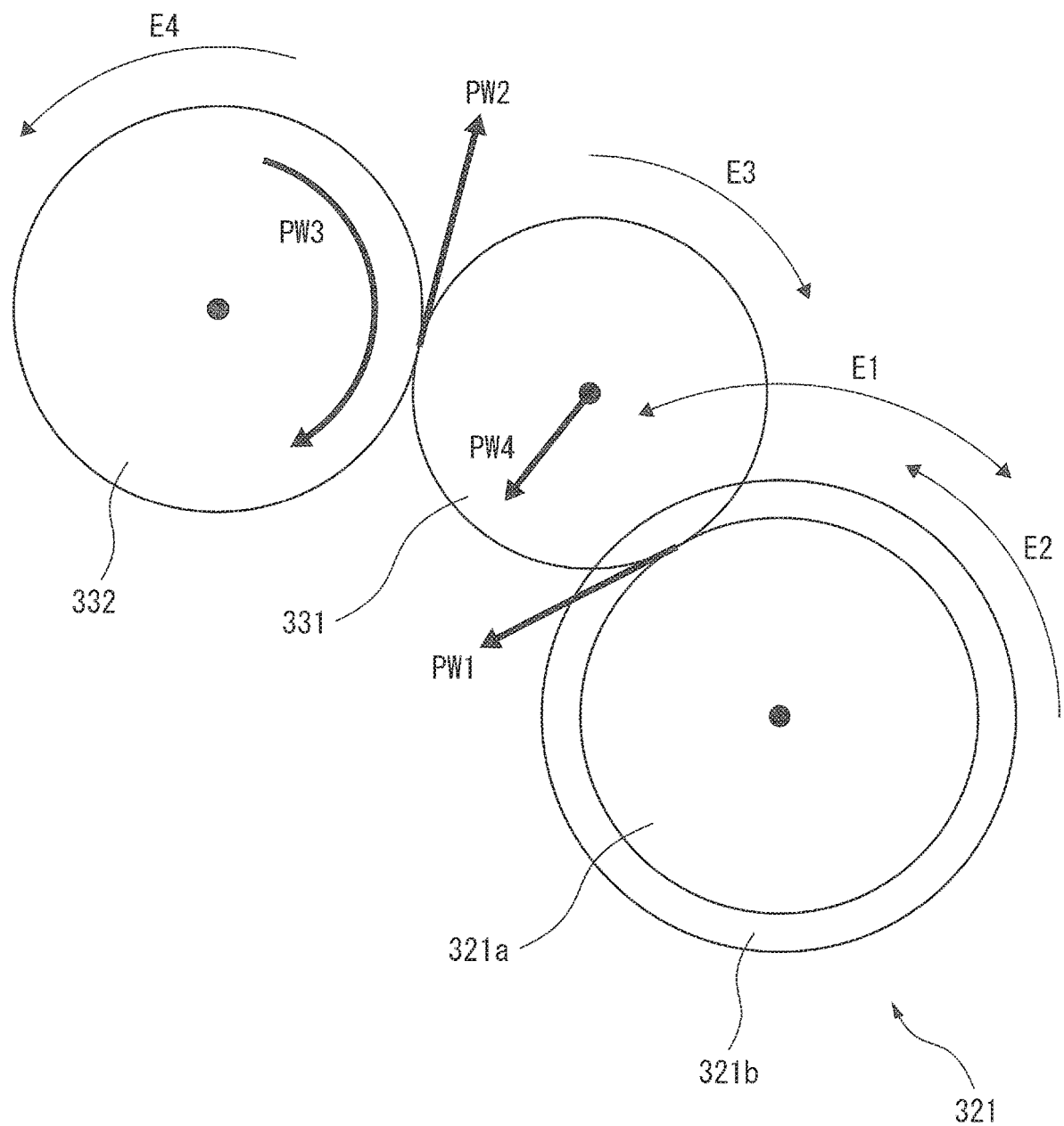
FIG. 10 is a drawing for explaining the force acting on a planet gear 331 when the document papers are separated and conveyed.

FIG. 10 is a drawing for explaining the force acting on the planet gear 331 when the document papers are separated and conveyed.

In FIG. 10, a reference numeral 321 denotes the sun gear, the reference numeral 321a denotes the gear part having the larger outer diameter of the sun gear that engages with the sixth gear 172, and the reference numeral 321b denotes the gear part having the smaller outer diameter of the sun gear that engages with the planet gear 331. When the document papers are separated and conveyed, the planet gear 331 engages with the drive gear 332 and transmits the drive force for driving the retard roller 113. The planet gear 331 can move around the sun gear 321 in the directions of the arrow E1.

When the document papers are separated and conveyed, the first drive force from the first motor 144 is transmitted to the sun gear 321 via the sixth gear 172 (see FIG. 3), and the sun gear 321 rotates in the direction of the arrow E2. Further, the sun gear 321 rotates the planet gear 331 in the direction of the arrow E3, and the planet gear 331 rotates the drive gear 332 in the direction of the arrow E4 and transmits the first drive force for rotating the retard roller 113.

By the engagement between the sun gear 321 and the planet gear 331, the force in the direction of the arrow PW1 acts between the sun gear 321 and the planet gear 331. Similarly, by engagement between the planet gear 331 and the drive gear 332, the force in the direction of the arrow PW2 acts between the planet gear 331 and the drive gear 332. As described above, the retard roller 113 has the torque limiter, and when the separated document papers are conveyed (in the direction of the arrow A3 in FIG. 3), a reaction force from the torque limiter in the direction of the arrow PW3, which is opposite to the rotation direction of the drive gear 332, is applied to the drive gear 332.

In this case, the force obtained by combining PW1, PW2 and PW3 acts on the planet gear 331. Since the PW2 and the PW3 are cancelling out each other, the force in the direction to push the planet gear 331 between the sun gear 321 and the drive gear 332 acts on the planet gear. Accordingly, when the document papers are separated and conveyed, engagement between the planet gear 331 and the drive gear 332 is easily maintained.

Figure 11:
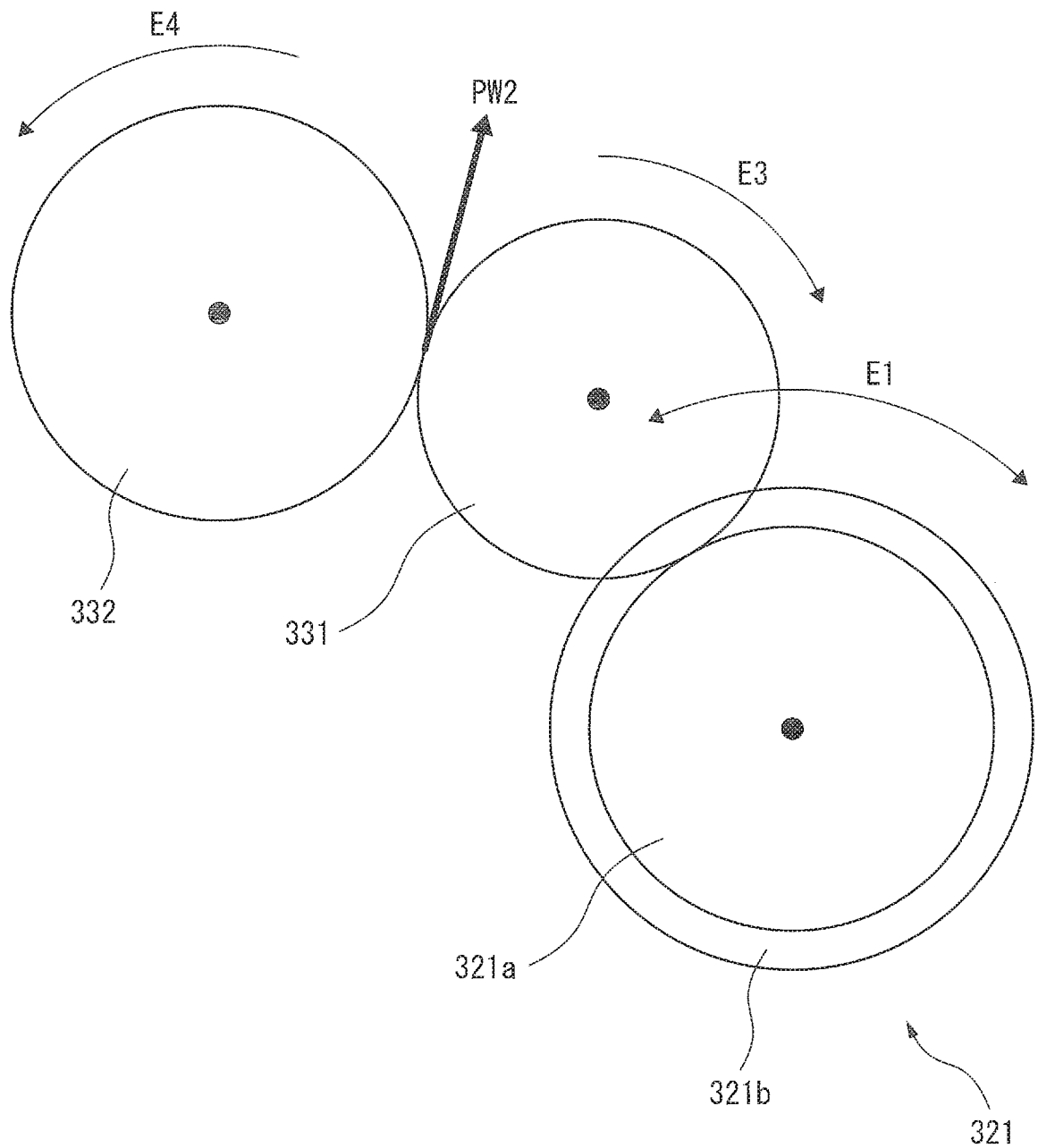
FIG. 11 is a drawing for explaining the force acting on the planet gear 331 when document papers are pulled out.

FIG. 11 is a drawing for explaining the force acting on the planet gear 331 when the document papers are pulled out.

When the document paper jam occurs during separating and conveying the document paper, since the CPU 202 described later stops the document paper conveying once, there is a case where the document conveyance device 100 is stopped with the document paper caught between the feed roller 112 and the retard roller 113. In this case, it is expected that a user pulls out the document paper in the direction of the arrow A4 (see FIG. 3) without opening the document paper conveying path of the document conveyance device 100. Since the document papers are being separated and conveyed, as illustrated in FIG. 10, the planet gear 331 engages with the drive gear 332.

When the document paper is pulled out, since the retard roller 113 is forcibly rotated in the rotation direction of the retard roller 113, the drive gear 332 that is mechanically coupled with the retard roller 113 receives the drive force for rotating in the direction of the arrow E4. Similarly, the planet gear 331 that engages with the drive gear 332 also receives the drive force for rotating in the direction of the arrow E3. Alternatively, since the document paper conveying is stopped, the first motor 144 is stopped, and thus, the rotation of the sun gear 321 is stopped.

In this case, since the planet gear 331 engages with the drive gear 332, the force in the direction of the arrow PW2 acts between the planet gear 331 and the drive gear 332. The direction of the arrow PW2 is the force in the direction in which the planet gear 331 is free from the engagement between the planet gear 331 and the drive gear 332. When the force of the arrow PW2 is strong, within a movable range around the sun gear 321, the planet gear 331 can be free from the engagement between the planet gear 331 and the drive gear 332. Accordingly, even when the document paper is pulled out, loads applied to gear surfaces of the planet gear 331, the drive gear 332 and the like and support shafts of both gears and the like can be reduced. As stated above, the drive gear 332, the planet gear 331 and the sun gear 321 are arranged so that when the planet gear 331 receives a drive force from the sun gear 321, the force let the planet gear 331 engage with the drive gear 332, and when the planet gear 331 receives a drive force from the drive gear 332, the force let the planet gear 331 separate from the drive gear 332, and the planet gear 331 and the drive gear 332 are separated.

<Block Diagram of Document Conveyance Device 100>

Figure 12:
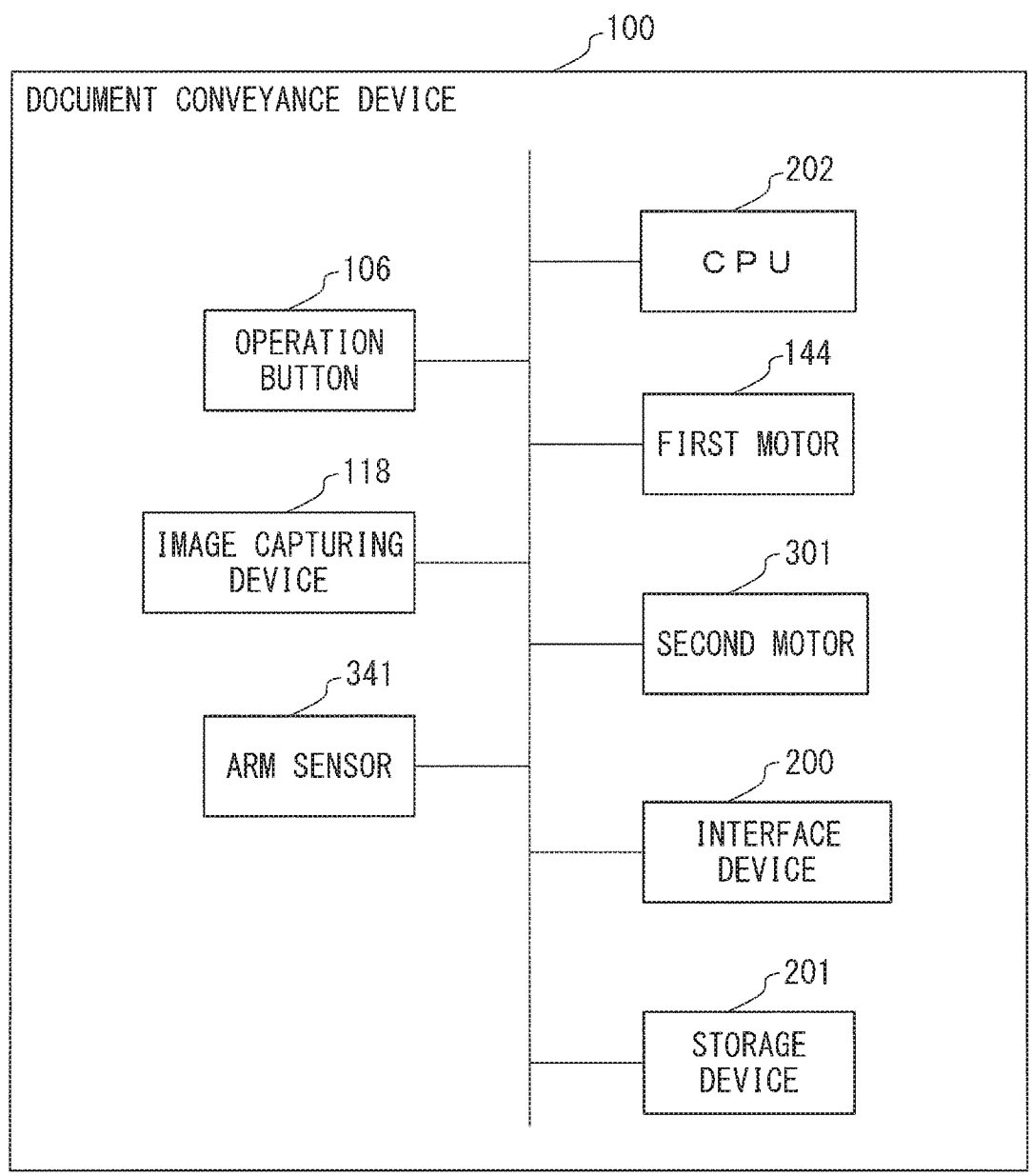
FIG. 12 is a block diagram illustrating a schematic configuration of the document conveyance device 100.

FIG. 12 is a block diagram illustrating a schematic configuration of the document conveyance device 100. The document conveyance device 100, in addition to the configurations illustrated in each of the above described drawings, includes an interface device 200, the storage device 201, and central processing unit (CPU) 202.

The interface device 200 has an interface circuit conforming to a serial bus such as USB. The interface device 200 is electrically connected with an unillustrated information processing device (for example, personal computer, mobile information terminal and the like) and transmits and receives a read image and various pieces of information. Further, instead of the interface device 200, a communication device having an antenna for transmitting and receiving the radio signal, and a wireless communication interface circuit for transmitting and receiving the signal via a wireless communication line, based on a certain communications protocol may be used. The certain communications protocol is, for example, a wireless local area network (LAN).

The storage device 201 includes a memory device such as random access memory (RAM) and read only memory (ROM), a fixed disk drive such as hard disc, or a flexible disk, and a portable storage device such as an optical disk. Further, the storage device 201 stores a computer program, a database, a table and the like which are used for various processes of the document conveyance device 100. The computer program may be installed from a computer-readable, non-transitory medium such as a compact disk read only memory (CD-ROM) and a digital versatile disk read only memory (DVD-ROM) to the storage device 201 by using a well-known setup program, etc. The storage device 201 stores the image data that is generated from the document paper.

The CPU 202 operates based on a program stored in advance in the storage device 201. Note that the CPU 202 may be configured from digital signal processor (DSP), large scale integration (LSI), application specific integrated circuit (ASIC), field-programming gate array (FPGA) and the like.

The CPU 202 is connected with the operation button 106, the image capturing device 118, the first motor 144, the interface device 200 and the storage device 201, and controls each of the devices. The CPU 202 conducts the drive control of the first motor 144 and the second motor 301, and the document paper reading control of the image capturing device 118 to read the document paper to conduct the image generation process.

Figure 13:
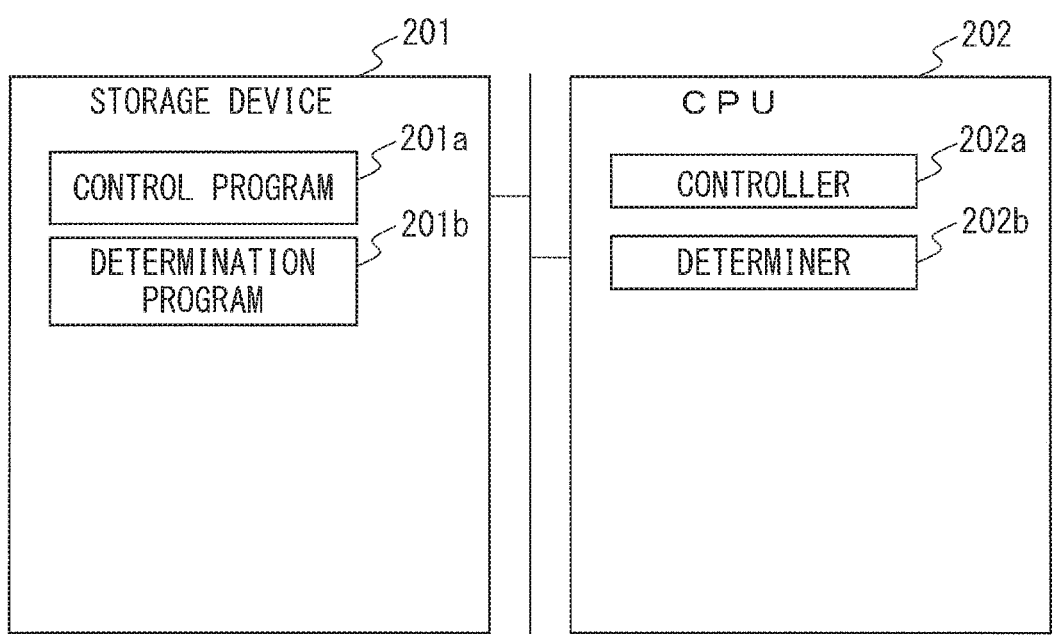
FIG. 13 is a drawing illustrating a schematic configuration of a storage device 201 and a CPU 202.

FIG. 13 is a drawing for illustrating a schematic configuration of the storage device 201 and the CPU 202.

As illustrated in FIG. 13, the storage device 201 stores each of the programs such as a control program 201*a* and a determination program 201*b*. Each of the programs is a functional module implemented by software operating on a processor. The CPU 202 reads each of the programs stored in the storage device 201, and operates based on each of the read programs so that the CPU 202 functions as the controller 202*a*, the determiner 202*b* and the like.

<Flow Chart of Operation of Document Conveyance Device 100>

Figure 14:
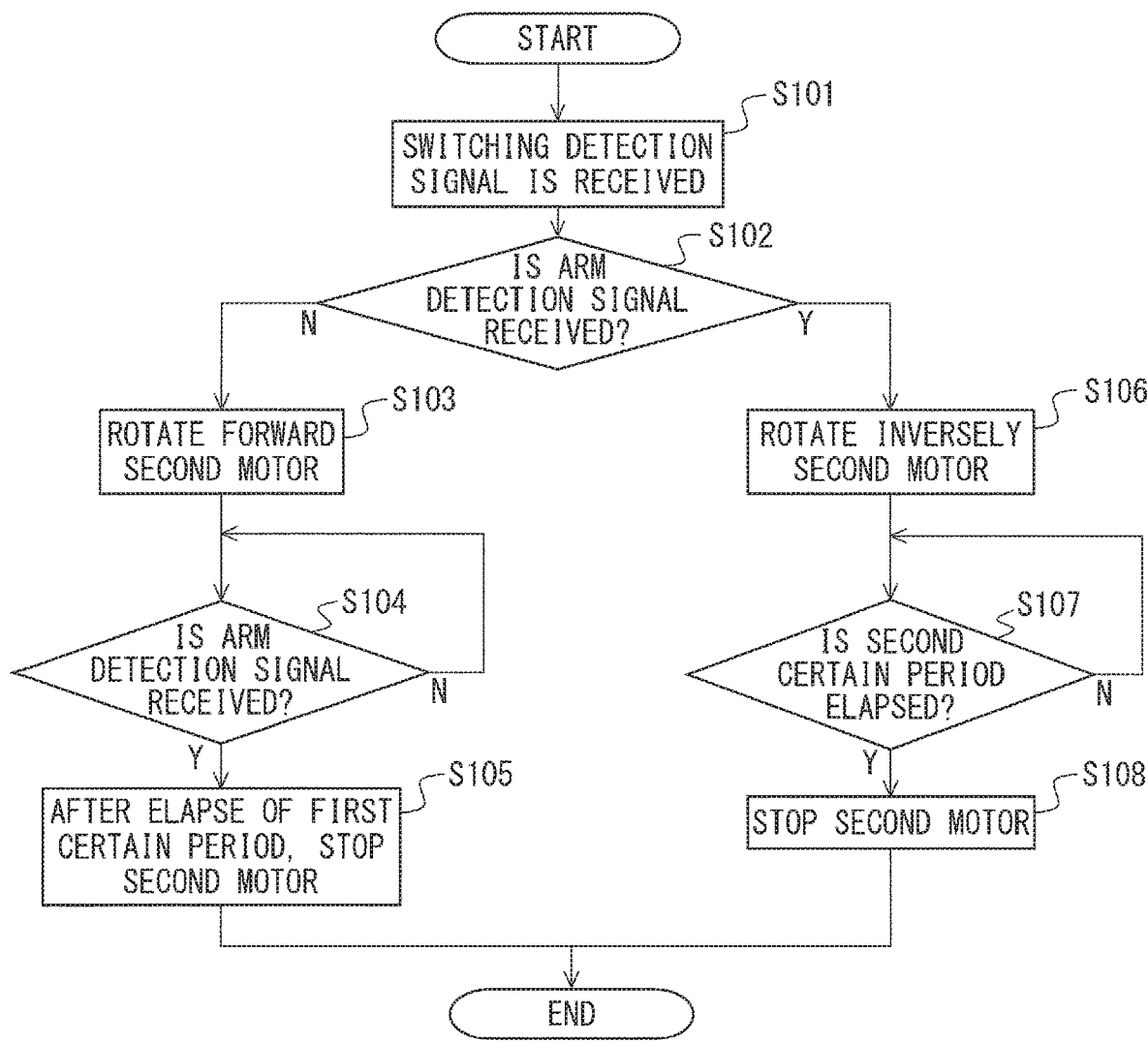
FIG. 14 is a flow chart illustrating one example of a switching process.

FIG. 14 is a flow chart illustrating one example of the switching process as to whether to separate the document papers. With referent to the flow chart illustrated in FIG. 14, an example of the switching process as to whether to separate the document papers is described below. Note that the flow of the processes described below is mainly conducted by the CPU 202 in cooperation with each element of the document conveyance device 100 based on the program stored in advance in the storage device 201.

First, the controller 202*a* waits until the operation button 106 for instructing the switching of separation conveying and non-separation conveying is pressed by a user and the operation detection signal for instructing the switching of separation conveying and non-separation conveying is received (S101).

After the operation detection signal was received, the determiner 202*b* determines whether the arm detection signal is received from the arm sensor 341 (S102). When it is determined that the arm detection signal is not received (N of S102), the controller 202*a* rotates the second motor 301 in forward (S103), and moves the arm 316 in the direction of the position Pb. During the rotation of the second motor 301, the determiner 202*b* waits for the reception of the arm detection signal (N of S104). When at S104, it is determined that the arm detection signal is received (Y of S104), the controller 202*a* stops the operation of the second motor 301 after a first certain time elapsed from when the arm detection signal was received (S105), and ends a series of processes.

At S102, when it is determined that the arm detection signal is received (Y of S102), the controller 202*a* rotates the second motor 301 inversely (S106), and moves the arm 316 in the direction of the position Pa. During the rotation of the second motor 301, the determiner 202*b* waits for the elapse of a second certain period (N of S107). When at S107, it is determined that the second certain period has elapsed (Y of S107), the controller 202a stops the operation of the second motor 301 (S108), and ends a series of processes. Thus, the explanation of the switching process as to whether to separate the document papers is ended.

Summary of First Embodiment

As described above in detail, the document conveyance device 100 is configured such that the locking of the arm 316 by the worm wheel 313 is released after the arm 316 moved by a certain distance, and the planet gear 331 is not further moved to a side of the drive gear 332. Accordingly, even if the worm wheel 313 rotates more than necessary due to the error in the amount of rotation of the second motor 301, the production error of the worm gear 312 and the like, no influence is caused to the position of the planet gear 331, and the planet gear 331 can appropriately engage with the drive gear 332.

By having the spring 318 for pressing the arm 316 in the direction in which the planet gear 331 is moved to a side of the drive gear 332, when the first drive force is transmitted to the retard roller 113, the separation of the planet gear 331 from the drive gear 332 can be prevented.

Second Embodiment

Figure 15:
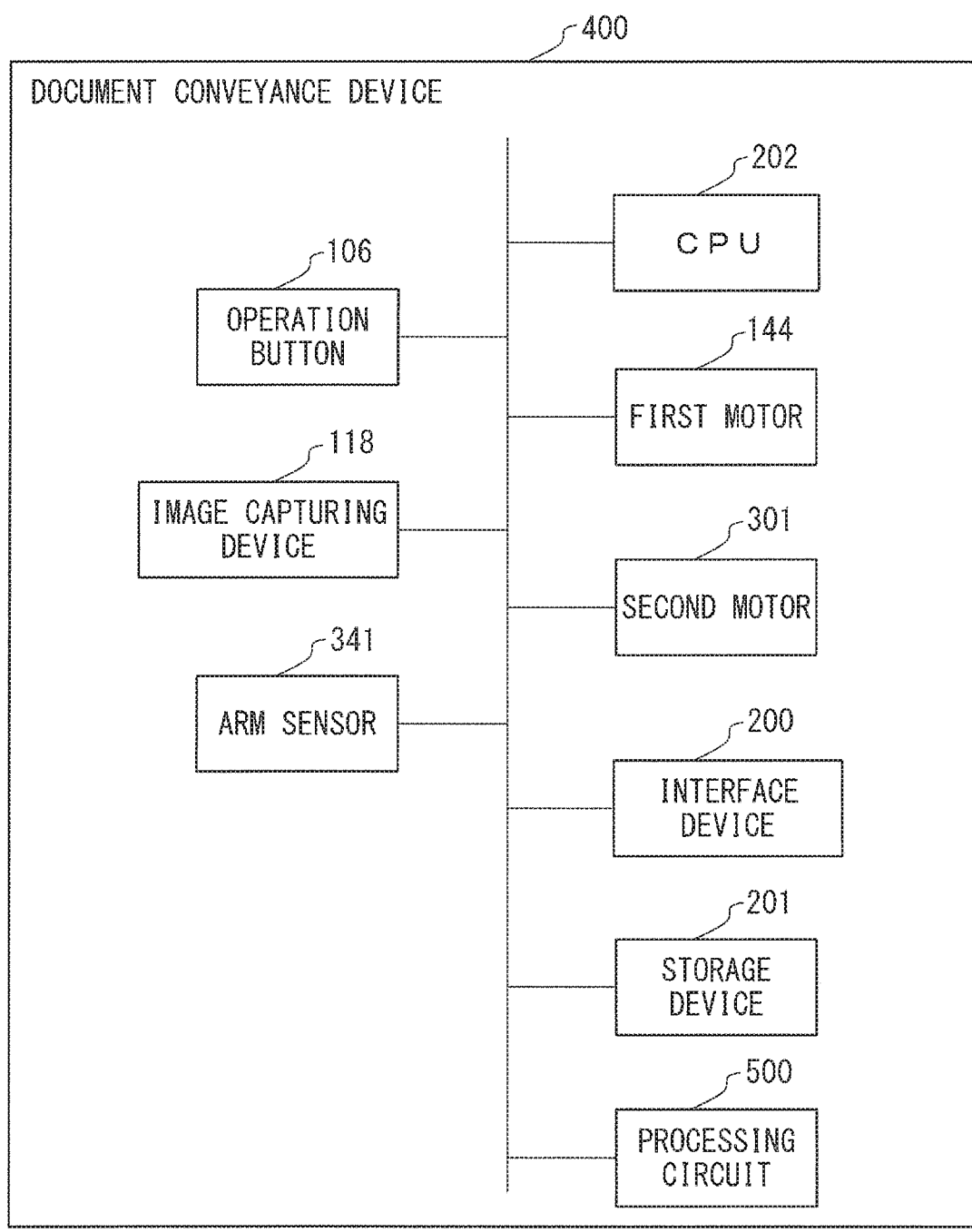
FIG. 15 is a block diagram illustrating a schematic configuration of another document conveyance device 400.

FIG. 15 is a block diagram illustrating a schematic configuration of a document conveyance device 400 according to the second embodiment. In FIG. 15, components that are the same as those in the first embodiment are denoted with the same reference numerals, and descriptions thereof are omitted.

The second embodiment is similar to the first embodiment except that the functions of the controller 202a and the determiner 202b in the first embodiment are realized by the processing circuit 500.

Figure 16:
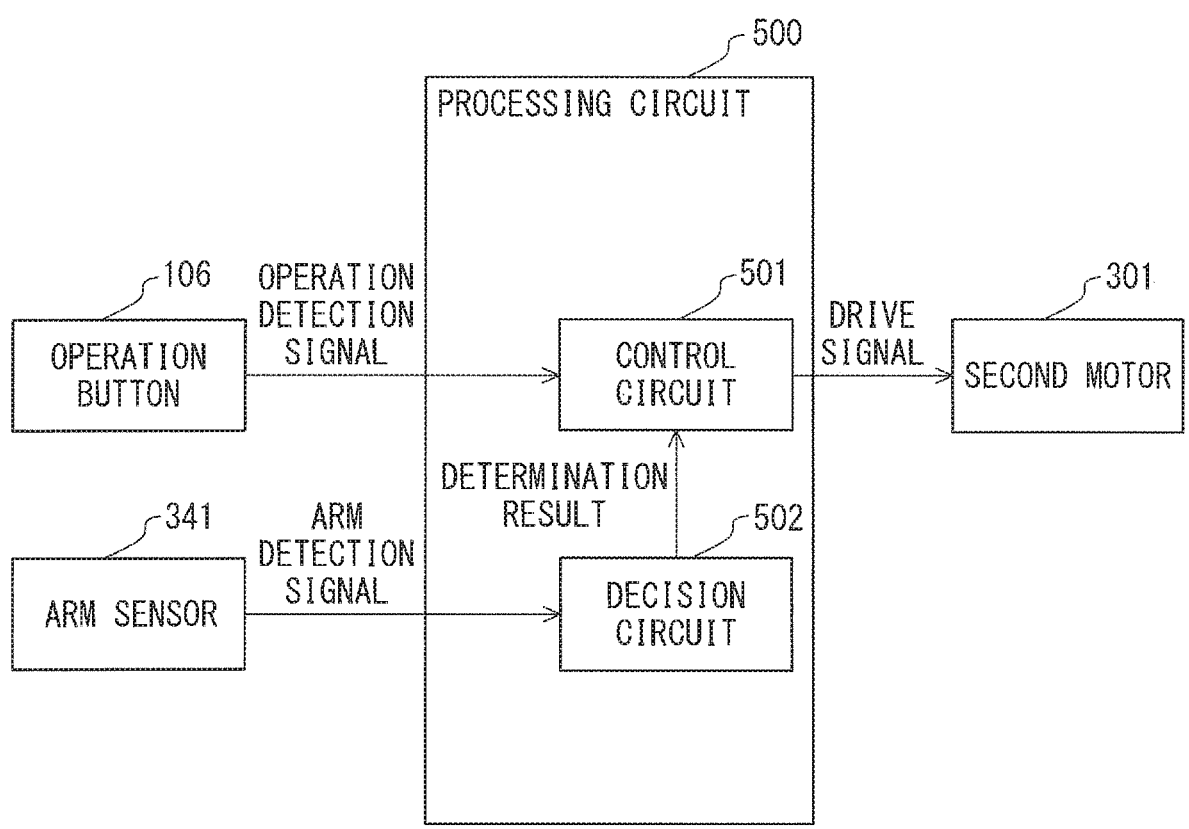
FIG. 16 is a drawing illustrating a schematic configuration of a processing circuit 500.

FIG. 16 is a drawing illustrating a schematic configuration of the processing circuit 500.

The processing circuit 500 is DSP, LSI, ASIC, FPGA, etc., and includes a control circuit 501, a decision circuit 502 and the like. Note that each of the circuits may be configured from independent integrated circuit, microprocessor, firmware and the like.

The control circuit 501 is one example of the controller. The control circuit 501 receives an operation detection signal from the operation button 106, receives a determination result from the decision circuit 502, and based on the operation detection signal and the determination result, outputs a drive signal for generating the drive force of the forward rotation or the inverse rotation of the second motor 301. Further, the control circuit 501 receives the determination result from the decision circuit 502, and based on the received determination result, outputs the drive signal for stopping the operation of the second motor 301.

The decision circuit 502 is one example of the determiner. The decision circuit 502 receives the arm detection signal from the arm sensor 341, based on the received arm detection signal, determines the position of the arm 316, and outputs the determination result to the control circuit 501.

According to the present embodiment, when the separation conveying and the non-separation conveying of the document papers are switched, regardless of the production error, etc., of the moving component, it is possible to appropriately change the combinations of the gears.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A document conveyance device comprising:
a feed roller for feeding a document paper;
a separation roller facing the feed roller;
a first motor for generating a first drive force for driving the separation roller;
a first transfer mechanism including a planet gear and a drive gear for engaging with the planet gear, for transferring the first drive force from the first motor to the separation roller;
a second motor for generating a second drive force; and
a position switching mechanism for switching a position of the planet gear from a first position in which the planet gear is separated from the drive gear and does not transmit the first drive force to the separation roller to a second position in which the planet gear engages with the drive gear and transmits the first drive force to the separation roller, based on the second drive force, wherein
the position switching mechanism includes
a support member for supporting the planet gear,
a spring for pressing the support member so that the planet gear moves closer to the drive gear,
a stop member for stopping the support member against a pressing force by the spring,
a move member for moving the stop member to move the support member so that the planet gear engages with the drive gear, based on the second drive force,
a second transfer mechanism for transferring the second drive force from the second motor to the move member, and
a block member for blocking a further movement of the support member by contacting the support member with the block member so that the further movement of the planet gear is prevented after the planet gear engaged with the drive gear, and wherein
the move member moves the stop member so that the entire stop member is apart from the support member after the planet gear engaged with the drive gear.

2. The document conveyance device according to claim 1, further comprising:
a sensor for detecting a position of the support member; and
a controller for controlling the second motor to stop an operation based on the detected position of the support member by the sensor.

3. The document conveyance device according to claim 1, further comprising a sun gear for transmitting the first drive force to the planet gear and engaged with the planet gear at all times,
wherein the drive gear, the planet gear and the sun gear are arranged in a manner that when the planet gear receives a drive force from the sun gear, the force engages the planet gear with the drive gear, and when the planet gear receives a drive force from the drive gear, the force separates the planet gear from the drive gear.

4. A control method of a document conveyance device including a feed roller for feeding a document paper, a separation roller facing the feed roller, a first motor for generating a first drive force for driving the separation roller, a first transfer mechanism including a planet gear and a drive gear for engaging with the planet gear, for transferring the first drive force from the first motor to the separation roller, a second motor for generating a second drive force, and a position switching mechanism including a support member for supporting the planet gear, a spring for pressing the support member so that the planet gear moves closer to the drive gear, a stop member for stopping the support member against a pressing force by the spring and a move member for moving the stop member to move the support member so that the planet gear engages with the drive gear, based on the second drive force, the method comprising:

switching a position of the planet gear from a first position in which the planet gear is separated from the drive gear and does not transmit the first drive force to the separation roller to a second position in which the planet gear engages with the drive gear and transmits the first drive force to the separation roller, based on the second drive force; and preventing a further movement of the planet gear after the planet gear engaged with the drive gear, wherein the move member moves the stop member so that the entire stop member is apart from the support member after the planet gear engaged with the drive gear.

5. A computer-readable, non-transitory medium storing a computer program of a document conveyance device including a feed roller for feeding a document paper, a separation roller facing the feed roller, a first motor for generating a first drive force for driving the separation roller, a first transfer mechanism including a planet gear and a drive gear for engaging with the planet gear, for transferring the first drive force from the first motor to the separation roller, a second motor for generating a second drive force, and a position switching mechanism including a support member for supporting the planet gear, a spring for pressing the support member so that the planet gear moves closer to the drive gear, a stop member for stopping the support member against a pressing force by the spring, a move member for moving the stop member to move the support member so that the planet gear engages with the drive gear, based on the second drive force and a block member for blocking a further movement of the support member by contacting the support member with the block member so that the further movement of the planet gear is prevented after the planet gear engaged with the drive gear, the computer program causing the document conveyance device to execute:

switching a position of the planet gear from a first position in which the planet gear is separated from the drive gear and does not transmit the first drive force to the separation roller to a second position in which the planet gear engages with the drive gear and transmits the first drive force to the separation roller, based on the second drive force, wherein the move member moves the stop member so that the entire stop member is apart from the support member after the planet gear engaged with the drive gear.

* * * * *